(12) United States Patent
Murphy et al.

(10) Patent No.: US 8,327,076 B2
(45) Date of Patent: Dec. 4, 2012

(54) SYSTEMS AND METHODS OF TIERED CACHING

(75) Inventors: Robert D. Murphy, Boulder, CO (US);
Robert W. Dixon, Longmont, CO (US);
Steven S. Williams, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 353 days.

(21) Appl. No.: 12/465,412

(22) Filed: May 13, 2009

(65) Prior Publication Data

US 2010/0293337 A1    Nov. 18, 2010

(51) Int. Cl.
*G06F 12/12*    (2006.01)
*G06F 12/08*    (2006.01)

(52) U.S. Cl. ............... 711/136; 711/135; 711/E12.071; 711/E12.022

(58) Field of Classification Search .................. None
See application file for complete search history.

(56) References Cited

U.S. PATENT DOCUMENTS

| | | | |
|---|---|---|---|
| 5,778,418 A | 7/1998 | Auclair et al. | |
| 5,794,228 A * | 8/1998 | French et al. | 1/1 |
| 6,016,530 A | 1/2000 | Auclair et al. | |
| 7,099,993 B2 | 8/2006 | Keeler | |
| 7,170,706 B2 | 1/2007 | Stence et al. | |
| 7,302,534 B2 | 11/2007 | Sinclair | |
| 2001/0025333 A1* | 9/2001 | Taylor et al. | 711/103 |
| 2006/0041602 A1* | 2/2006 | Lomet et al. | 707/201 |
| 2007/0174546 A1* | 7/2007 | Lee | 711/113 |
| 2009/0077304 A1* | 3/2009 | Hong et al. | 711/103 |
| 2010/0030944 A1* | 2/2010 | Hinz | 711/103 |
| 2010/0172180 A1* | 7/2010 | Paley et al. | 365/185.12 |

OTHER PUBLICATIONS

"Hybrid Hard Disk and ReadyDrive Technology: Improving Performance and Power for Windows Vista Mobile PCs," Microsoft Corporation, 2006, http://download.microsoft.com/download/5/b/9/5b97017b-e28a-4bae-ba48-174cf47d23cd/STO008_WH06.ppt.
"Hybrid Hard Disk Drive Logo Test," Microsoft Corporation, 2009, http://msdn.microsoft.com/en-us/library/dd424412.aspx.
Genuth, I., "Samsung's Hybrid Hard Drive Exposed," http://thefutureofthings.com/articles/30/samsungs-hybrid-hard-drive-exposed.html, Oct. 19, 2006.
Coughlin, T., "Flash Memory in Hybrid Hard Disk Drives, a Beneficial Symbiosis," Gerson Lehrman Group, Jan. 16, 2007, http://www.glgroup.com/News/Flash-Memory-in-Hybrid-Hard-Disk-Drives-a-Beneficial-Symbiosis-7610.html.
"Windows ReadyDrive and Hybrid Hard Disk Drives," Microsoft Corporation, May 23, 2006, http://surewin.kr/vistasolvers/Hybrid.doc.

* cited by examiner

*Primary Examiner* — Hoai V Ho
*Assistant Examiner* — James G Norman
(74) *Attorney, Agent, or Firm* — Cesari & Reed, LLP; Kirk A. Cesari

(57) ABSTRACT

The disclosure is related to data storage systems having multiple cache and to management of cache activity in data storage systems having multiple cache. In a particular embodiment, a data storage device includes a volatile memory having a first read cache and a first write cache, a non-volatile memory having a second read cache and a second write cache and a controller coupled to the volatile memory and the non-volatile memory. The memory can be configured to selectively transfer read data from the first read cache to the second read cache based on a least recently used indicator of the read data and selectively transfer write data from the first write cache to the second write cache based on a least recently written indicator of the write data.

20 Claims, 4 Drawing Sheets

SYSTEMS AND METHODS OF TIERED CACHING

FIELD

The present disclosure is generally related to data storage systems having multiple cache and to management of cache activity in data storage systems having multiple cache.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
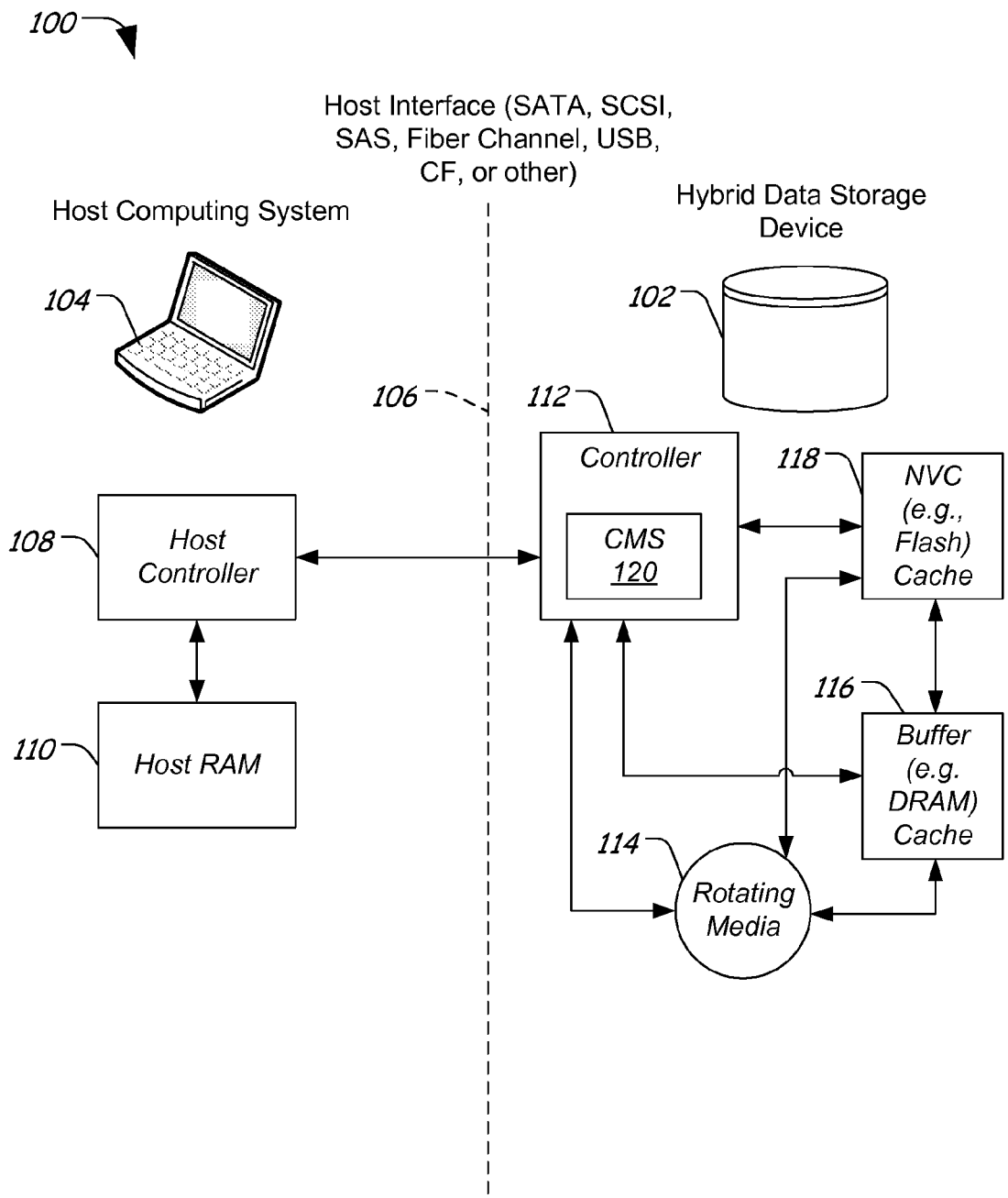
FIG. 1 is a block diagram of a particular embodiment of a data storage system including a data storage device having a cache management system.

Referring to FIG. 1, a block diagram of a particular embodiment of a computer system is shown and generally designated 100. The computer system 100 can include a host computing system, or host, 104 and a data storage device 102. The host 104 may be a laptop computer, a desktop computer, a server, a portable device such as a music player or telephone, a digital video recorder, or any other processing system. The data storage device 102 may be any type of data storage device that includes more than one type of data storage medium, such as a storage device with volatile solid state memory and non-volatile solid state memory or a storage device with a relatively fast memory and a relatively slow memory. In another example, the data storage device 102 may be a hybrid data storage device. As used herein, the term "hybrid data storage device" refers to a data storage device that includes at least two distinct non-volatile data storage media. In a particular example, a hybrid data storage device can include a rotating storage medium, such as a magnetic disc, and a solid-state storage medium, such as a flash memory. In another particular example, a hybrid data storage device can include a first type of nonvolatile solid state memory and a second type of nonvolatile solid-state storage medium. However, the methods and systems discussed herein are not limited to a hybrid data storage device.

The data storage device 102 can be adapted to communicate with the host 104 via an interface 106, such as a Serial Advanced Technology Attachment (SATA), a small computer system interface (SCSI), a serial attached SCSI (SAS), a Fiber Channel interface, a universal serial bus (USB) interface, or any other interface. The data storage device 102 can include a controller 112 that is adapted to communicate with a rotating data storage medium 114 (such as a magnetic disc), a data buffer (such as a dynamic random access memory) 116, and a non-volatile cache 118 (such as a flash memory). The controller 112 may be adapted to implement a cache management system 120. The cache management system 120 may comprise firmware, hardware logic, or any combination thereof.

The cache management system 120 can also be responsible for maintaining speculative read data from a storage media which may include data physically before and after the requested host data; this data here after is referred to as Read On Arrival and Rood Look Ahead, respectively.

The data buffer 116 may be referred to as a volatile cache. As used herein, "cache" refers to an area of a memory used to temporarily store data. The area may be specifically reserved to be used as a cache. For example, frequently used or most recently used data may be stored in a cache to allow a system quick access to such data, while such data is or will be also stored more permanently in another area of the data storage device.

The host computing system 104 may include a host controller 108 that is coupled to a random access memory (RAM) 110. The host controller 108 may be coupled to the drive controller 112 via the interface 106.

Generally, the controller 112 via the cache management system 120 may move data between the rotating data storage medium 114, the data buffer 116, and the non-volatile cache 118. The methods described herein of choosing what data and when to move the data between the rotating data storage medium 114, the data buffer 116, and the non-volatile cache 118 may be referred to as a tiered cache system.

In a particular embodiment, in response to receiving a read request from the host 104, the controller 112 can move data from the rotating data storage medium 114 to the buffer cache 116 to be provided to the host 104. Then, at a later time, the controller 112 can transfer the data from the buffer cache 116 to the non-volatile cache 118. This can allow the data storage device 102 to quickly respond to the read request, while also keeping a copy of the data related to the read request in a non-volatile cache. Further, Read-On-Arrival data, Read-Look-Ahead data, or other read cache information can be maintained in the non-volatile cache 118.

In another embodiment, in response to receiving a write command, the controller 112 can move data received from the host 104 to the buffer cache 116. The controller 112 can move the data from the buffer cache 116 to the non-volatile cache 118. At a later time, the controller 112 can transfer the data from the non-volatile cache 118 to the rotating data storage medium 114 or another non-volatile memory. Thus, the non-volatile cache 118 can be used as a non-volatile data storage for write cache data. This can allow for a reduced response time to allow notification to the host 104 that a write request has been completed. The controller 112 may quickly move the write cache data in the buffer cache 116, i.e. the data received from the host, to the non-volatile cache 118 when the host 104 requests a flush cache to ensure that data is stored to a non-volatile memory.

In some instances, the drive controller 112 can coalesce data stored at the data buffer 116, so that fragments or obsolete data can be removed or combined before the data is committed to the non-volatile cache 118. This can improve wear leveling of the non-volatile cache 118 due to removal or combination of data fragments before storing data to the non-volatile cache 118.

It should be understood that, though the above-described embodiment includes a rotating media 114, the data storage device 102 can be a solid-state data storage device. For example, a solid-state data storage device could have a solid state volatile cache, a solid state non-volatile cache, and a solid state non-volatile main data store. In some instances, storing data to the solid state non-volatile cache may be relatively faster than storing data to the solid state non-volatile main data store. In a particular embodiment, the solid state volatile cache may be dynamic random access memory, the solid state non-volatile cache may be flash memory, and the solid state non-volatile main data store may also be flash memory.

Figure 2:
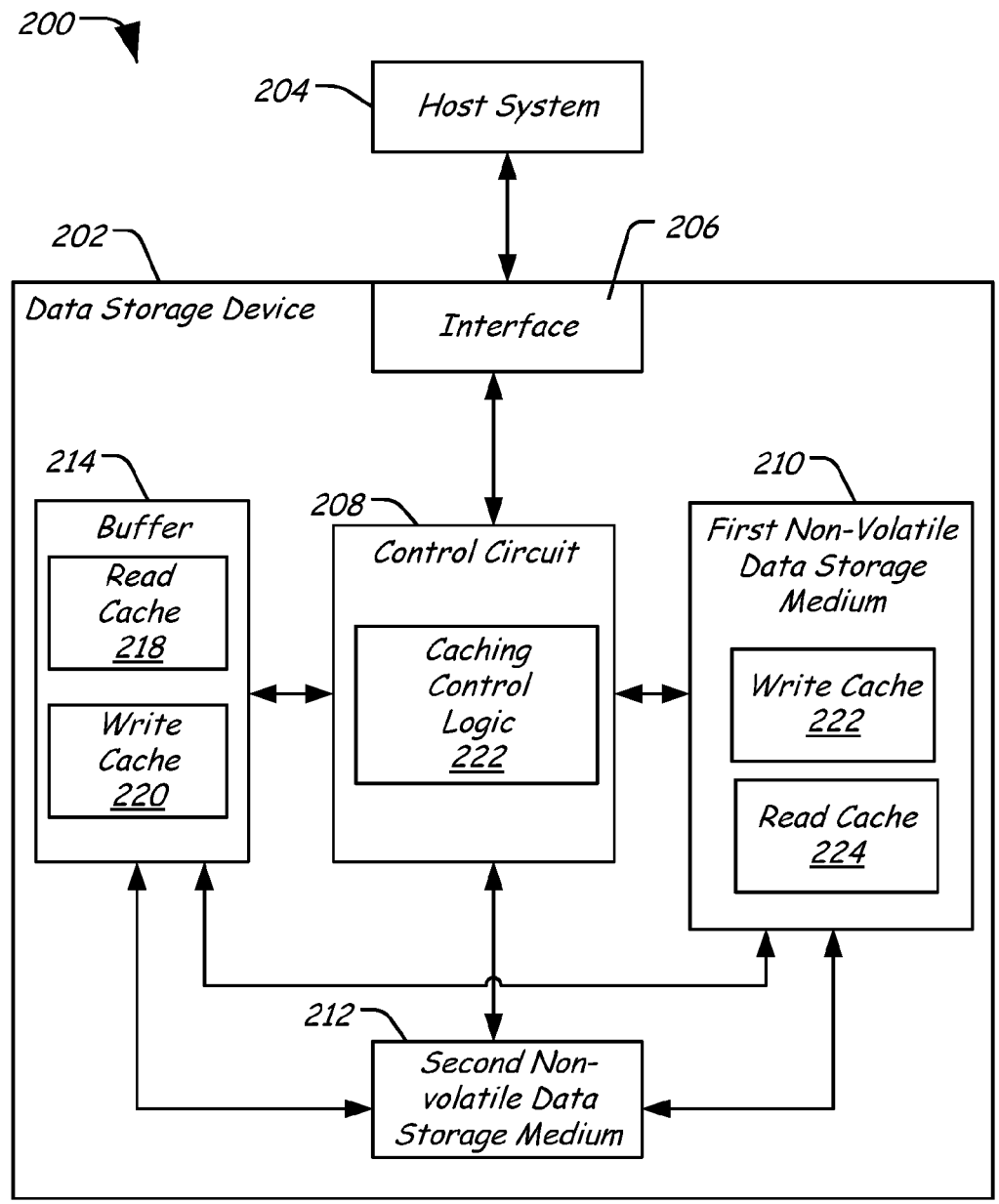
FIG. 2 is a block diagram of another particular embodiment of a data storage system including a data storage device having a cache management system.

FIG. 2 is a block diagram of a particular illustrative embodiment of a data storage system 200 including a data storage device 202 adapted to communicate with a host system 204 via an interface 206. The data storage device 202 can include a control circuit 208, such as a controller or processor, coupled to a volatile data buffer 214, such as dynamic random access memory (DRAM), a first non-volatile data storage medium 210, and a second non-volatile data storage medium 212. In a particular embodiment, the first non-volatile data storage medium 210 may be relatively fast to store and retrieve data compared to the second non-volatile data storage medium 212. For example, the first non-volatile data storage medium 210 may be a solid-state memory, such as flash memory, and the second non-volatile data storage medium 212 may be a magnetic disc.

The control circuit 208 may include caching control logic 222 that can control data storage and retrieval from a read cache 218 and a write cache 220 of the volatile buffer 214, can control data storage and retrieval from a read cache 224 and a write cache 222 of the first non-volatile data storage medium 210, and can control data storage and retrieval from the second non-volatile data storage medium 212. The control circuit 208, by executing firmware or hardware circuits, may move data between the volatile buffer 214, the first non-volatile data storage medium 210, and the second non-volatile data storage medium 212 based on commands received from the host, timing, or other factors. For example, the other factors may include moving data based on a frequency of use of the data, an importance of the data, or another characteristic of the data, such as size, type of data, or a creation time.

In a particular embodiment, in response to a read request from the host system 204, the control circuit 208 can move data from the second non-volatile data storage medium 212 to the read cache 218 within the volatile buffer 214, which can be passed to the host system 204 via the interface 206. After the read request has been completed, the caching control logic 222 may move the requested read data to the read cache 224 of the non-volatile cache.

In response to a write request from the host system 204, the control circuit 208 can cause data received via the interface 206 to be written to the write cache 220 of the volatile data buffer 214, which then may be selectively moved to the write cache 222 of the first non-volatile data storage medium 210. The data storage device 202 may then notify the host system 204 that the write request was completed. Then, at a later time, the control circuit 208 may selectively move the data from the first non-volatile data storage medium 210 to the second non-volatile data storage medium 212. In a particular example, the control circuit 208 may keep track of least recently used data within the volatile buffer 214 and may also keep track of requests received via the host system 204 to filter pre-fetch or look-ahead data that wasn't requested by the host system 204, thereby reducing writes to the first non-volatile data storage medium 210.

In another particular embodiment, which may be referred to as write caching enabled, the control circuit 208 can cause data received via the interface 206 to be written to the volatile data buffer 214. The control circuit 208 can then signal to the host that the write command has been completed. Later, the control circuit 208 may move the data from the volatile data buffer 214 to the first non-volatile data storage medium 210 which can include a non-volatile cache. Even later, the data may be moved in the background from the first non-volatile data storage medium 210 to the second non-volatile data storage medium 212. Background processing can occur at a time when the data storage device can use idle resources, such as energy resources, processing resources, or bandwidth resources.

Figure 3:
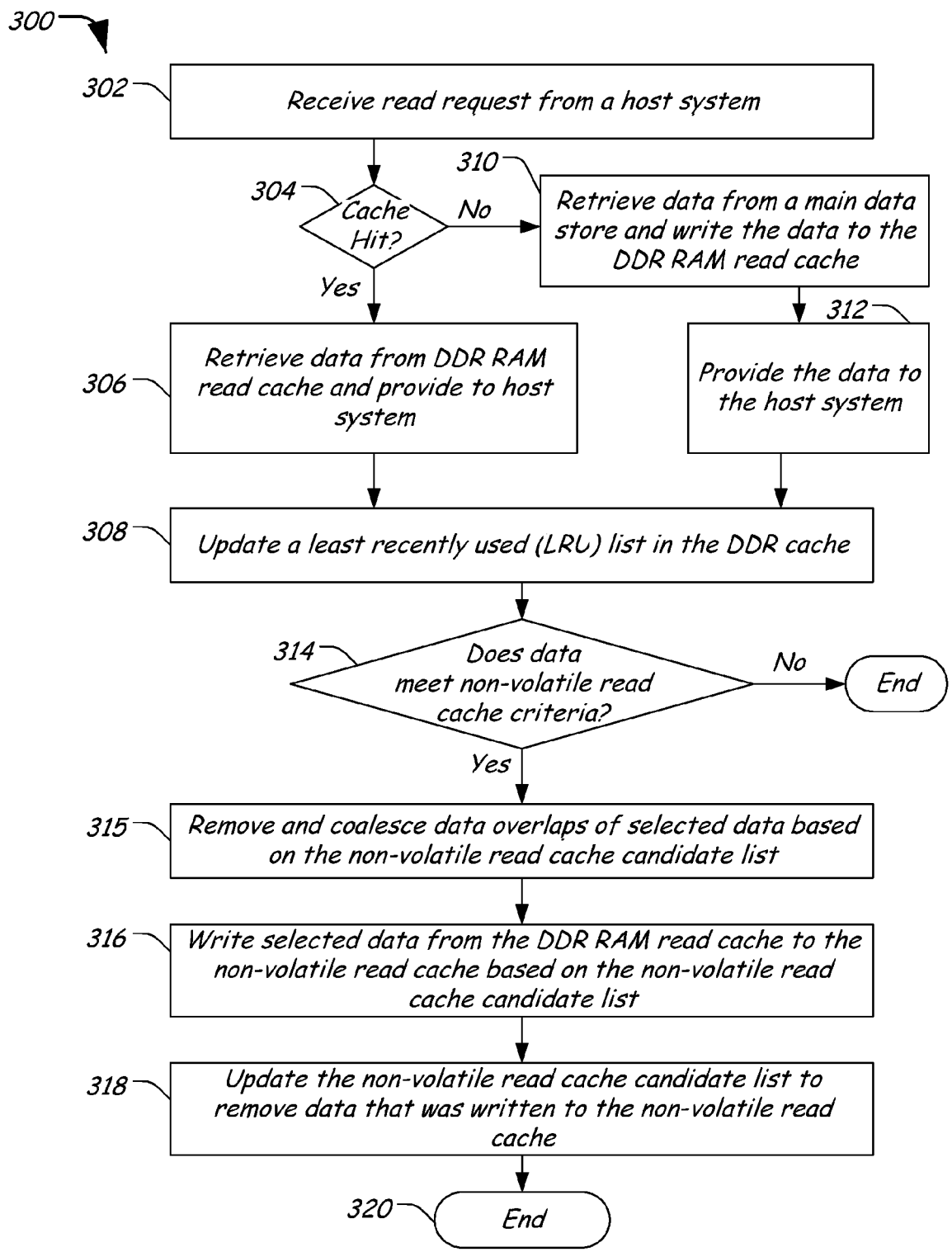
FIG. 3 is a flow diagram of a particular embodiment of a method of cache management.

FIG. 3 is a flow diagram of a particular embodiment of a method of cache management generally designated 300. Specifically, FIG. 3 shows a method of managing multiple caches when a read request is received from a host. The cache management method 300 may be performed by a controller of a data storage device, such as the control circuit 208 and caching control logic 222 shown in FIG. 2. In a particular embodiment, a first read cache may be a double data-rate random access memory (DDR RAM) read cache and a second read cache may be a non-volatile read cache, such as a flash memory read cache.

When a read request is received from a host system, at 302, the method 300 can determine if the requested data is already in the DDR RAM read cache, at 304. If the data is in the DDR RAM read cache, the method 300 can retrieve the data from the DDR RAM read cache and provide it to the host system, at 306. After the data is provided to the host system, a least recently used (LRU) list, which may be stored in the DDR RAM read cache, can be updated to indicate the latest read request associated with the data, at 308.

When the requested data is not in the DDR RAM read cache, the data may be retrieved from a main data store, such as a rotatable data storage medium or a main solid-state storage area. In a particular embodiment, read-on-arrival data, host request data, and read-look-ahead data can be retrieved from the main data store and written to the DDR RAM read cache, at 310, and subsequently provided to the host system, at 312. After the data is provided to the host system, a least recently used (LRU) list can be updated to indicate the latest read request associated with the data, at 308.

The method may also determine whether the cache hit meets certain criteria to move the data from the DDR RAM read cache to the non-volatile read cache, at 314. For example, the criteria may be a length of the data. For example, it may be desirable to record very short amounts of data, such as read requests involving 32 blocks or less of data, to the non-volatile read cache. In another example, the criteria may be a threshold level to ensure a minimum fill level of the non-volatile cache. In yet another example, the criteria may be a property of the data, such as a type of data, an importance of the data, or a uniqueness of the data (that is there exists no other copies of the data in the data storage device). Further, the criteria may be adjusted dynamically by the data storage device to keep a certain amount of read data in the non-volatile cache or to ensure the amount of read data in DDR RAM read cache is below a certain amount.

In a particular example, data segments or nodes can be selected to be moved from the DDR RAM read cache to the non-volatile read cache, or the main data store, based on the least recently used list. The least recently used data may be transferred to the non-volatile cache since there may be a less likelihood that the host system will need that data before it needs more recently used data.

A non-volatile read cache transfer list may be created and stored to allow a quick indication of an order in which data should be transferred from the DDR RAM read cache to the non-volatile read cache. The list may be updated as data is stored in the DDR RAM read cache and the list may include identifiers that signify the criteria used to select and/or prioritize the data to transfer. Further, the list may be updated periodically or after certain events, such as a data transfer from the DDR RAM read cache to the non-volatile read cache.

When the criteria is met and before the data is moved from the DDR RAM read cache to the non-volatile read cache, data overlaps can be removed and coalesced, at 315. In some systems, such as flash memory, this may allow for a reduction in write amplification without using partial page programming. Also, by coalescing the data, an alternative to partial page programming can be implemented. Further, particular data nodes within the DDR RAM read cache can be erased and made available for new host data or data from the main data store. Then, the method 300 may move the selected data, which may be the host requested data or the whole data segment, which may include the read-on-arrival data, the host requested data, and the read-look-ahead data, from the DDR RAM read cache to the non-volatile memory read cache, at 316. This may be done during an opportune time for the data storage device, such as during an idle period or when host activity falls below a threshold activity level.

After the selected data is moved from the DDR RAM read cache to the non-volatile read cache, the non-volatile read cache candidate list can be updated to remove the moved data. For instance, data segments that have a number of empty blocks associated with them may be removed to free up space in the non-volatile read cache as needed. Also, data in the non-volatile read cache may be removed based on the age of the data or the length of time the data has been in the non-volatile read cache or based on a least recently used list.

Figure 4:
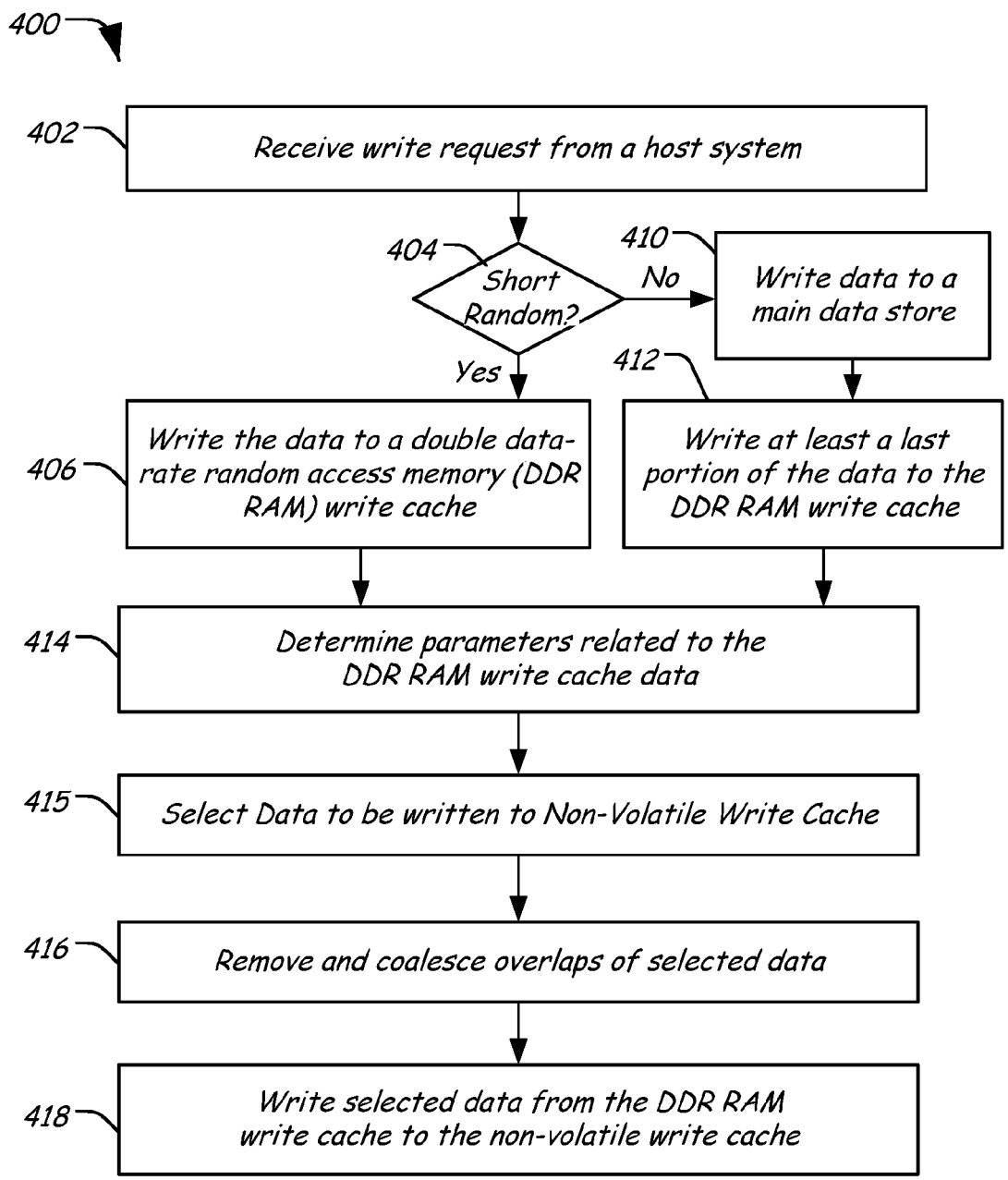
FIG. 4 is a flow diagram of another particular embodiment of a method of cache management.

FIG. 4 is a flow diagram of a particular embodiment of a method of cache management generally designated 400. Specifically, FIG. 4 shows a method of managing multiple caches when a write request is received from a host. The cache management method 400 may be performed by a controller of a data storage device, such as the control circuit 208 and caching control logic 222 shown in FIG. 2. In a particular embodiment, a first write cache may be a double data-rate random access memory (DDR RAM) write cache and a second write cache may be a non-volatile write cache, such as a flash memory write cache.

A write request can be received from a host system, at 402, and a determination may be made whether the write request involves a short random write operation, at 404. Whether the write request involves short random writes or another type of write, such as a long sequential write, can be used to selectively choose a particular caching methodology within the data storage device. For example, it may be desirable to record short write requests, such as write requests involving 32 blocks or less of data, directly to a DDR RAM cache than to a disc storage medium to reduce random seeks and associated seek/settle times that can adversely impact performance. When the write request involves short random write operations, the data can be stored to the DDR RAM write cache, at 406.

When the write requests do not involve short random write operations, the data can be written to a main data store, at 410, such as a magnetic data storage medium or another non-volatile solid-state data storage medium. When long data writes occur, the data may be written to the main data store in sequential physical addresses to allow for efficient storage and retrieval of the data. This could be particularly useful when storing large media files, such as audio or video files. Further, whether or not the writes are short random writes, the method 400 may determine where to store the data based on the type of data. For example, the method 400 may store the data to the main data store without storing it in the DDR RAM cache when the data is audio or video data.

In a particular embodiment, when the data is being written directly to the main data store, at 410, the method 400 may then write at least a portion of the data to the DDR RAM write cache. In some instances, the portion of data may be a first portion and/or a last portion of the data to be saved. This may benefit the data storage device to quickly retrieve the data when a read request for such data is received.

The method 400 may include determining parameters related to the DDR RAM write cache data, at 414. Based on the parameters, the method 400 may select which data is to be written to the non-volatile write cache, at 415. For example, least recently written data nodes may be selected to be written from the DDR RAM write cache to the non-volatile write cache. Other parameters can include the type of data stored in the DDR RAM write cache, whether the data has been changed and is therefore obsolete, whether the data does not match certain criteria, or any combination thereof. Further, other parameters may include a length of time the data has spent in the DDR RAM write cache. Determination of which data to write to the non-volatile write cache may be based on any combination of parameters, including any combination of the parameters listed herein.

Even further, all of the data in the DDR RAM write cache can be periodically flushed, that is moved or copied, to the non-volatile write cache. The flush operation can select the entire contents of the DDR RAM write cache to be transferred to the non-volatile write cache. In a particular embodiment, a flush operation may be set to occur periodically. However, the determination of when to flush the DDR RAM write cache to the non-volatile write cache may based on a trigger event such as a threshold amount of data stored in the DDR RAM write cache, a periodic timer, an error detection, or a power event. A power event may include power loss, a power fluctuation, or loss of power to a certain portion of the data storage device, such as a pre-amplifier or a spindle motor.

In a particular embodiment, the selected data, while stored at the DDR RAM write cache, may be coalesced and have node overlaps removed, at 416. In some systems, this may benefit efficient writing and wear-leveling at the non-volatile write cache by reducing write amplification without using partial page programming. In addition, reducing the non-volatile write cache node count can be an important factor to decrease processing time and increase performance.

The selected data in the DDR RAM write cache can be transferred to the non-volatile cache, at 418. The data storage device may choose to move all or some of the selected data from the non-volatile write cache to the main data store at another time, such as when host activity falls below a threshold activity level. For example, the data storage device may move the data to the main data store based on a number of empty blocks or based on a length of time the data has been in the non-volatile cache. When data is moved to the main data store, data blocks within the non-volatile write cache can then be erased and allocated to a free pool to allow more data from the DDR Ram write cache to be stored. This technique may reduce write amplification while keeping most recent writes in the non-volatile write cache.

Even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles discussed herein. The illustrations are not intended to serve as a complete description of all of the elements and features of apparatus and systems that utilize the structures or methods described herein. Many other embodiments may be apparent to those of skill in the art upon reviewing the disclosure. For example, the particular elements may vary depending on the particular application for the data storage system while maintaining substantially the same functionality without departing from the scope and spirit of the present disclosure. In addition, although an embodiment described herein is directed to a hybrid data storage system including a disc data storage medium and at least one non-volatile solid-state data storage medium, it will be appreciated by those skilled in the art that the teachings of the present application can be applied to solid-state data storage devices having only solid-state data storage media and other types or combinations of data storage media.

What is claimed is:

1. A device comprising:
   a volatile solid state memory having a first cache;
   a non-volatile data storage medium; and
   a controller coupled to the volatile solid state memory and the non-volatile data storage medium, the controller configured to:
      determine an attribute of data associated with a specific write command;
      store the data in the first cache when the attribute is a first value;
      store the data directly to the non-volatile data storage medium, without storing all of the data in the first cache, when the attribute is a second value; and
      storing a portion less than all of the data in the first cache when the attribute is the second value.

2. The device of claim 1 further comprising a non-volatile solid state memory having a second cache and the controller is configured to determine a priority order other than a first-in first-out (FIFO) basis to transfer the data from the first cache to the second cache.

3. The device of claim 2 further comprising:
   an interface coupled to the controller, the interface adapted to receive commands and data from a host;
   the first cache and the second cache are not addressable data storage accessible by the host to store data; and
   the non-volatile data storage medium includes addressable data storage accessible by the host.

4. The device of claim 3 wherein the volatile solid state memory is a dynamic random access memory and the non-volatile solid state memory is a flash memory.

5. The device of claim 3 wherein the controller is further configured to:
   select data to be transferred from the first cache to the second cache when a trigger condition occurs; and
   transfer the selected data from the first cache to the second cache when the trigger condition occurs.

6. The device of claim 5 wherein the trigger condition comprises a uniqueness of specific data where there exists no other copies of the specific data in the device.

7. The device of claim 3 further comprising the controller configured to maintain a maximum amount of read data in the first cache and transfer selected read data to the second cache to be at or below the maximum amount of read data in the first read cache.

8. A data storage device comprising:
   a volatile memory having a first cache;
   a first non-volatile memory having a second cache;
   a second non-volatile memory;
   a controller coupled to the volatile memory, the first non-volatile memory, the second non-volatile memory, and configured to:
      receive a write request sent to the data storage device by a host system;
      selectively choose a particular caching methodology of multiple available caching methodologies within the data storage device based on an attribute of the write request;
      a first caching methodology of the multiple available caching methodologies including determining a type of data associated with the write request and selectively storing the data associated with the write request directly to the second non-volatile memory when a type of the data is a specific type regardless of a size of the data and without storing all of the data in the volatile memory;
      selectively transfer data from the first cache to the second cache.

9. The data storage device of claim 8 further comprising the controller adapted to remove data overlaps and coalesce selected data before moving the selected data from the first cache to the second cache.

10. The data storage device of claim 8 further comprising the second non-volatile memory is addressable for data storage by a host and both the volatile memory and the first non-volatile memory are not addressable for data storage by the host.

11. The data storage device of claim 8 wherein, when the data associated with the write request is stored to the second non-volatile memory, a portion that is less than all of the data associated with the write request is selectively stored in the first cache.

12. The device of claim 1 wherein the attribute is a threshold length of data, the first value is a size of the data less than the threshold, the second value is the size of the data greater than the threshold.

13. The device of claim 5 wherein the attribute is a type of data file associated with the data, the first value is a non-audio and non-video type of data file, and the second value is an audio or video type of data file.

14. The device of claim 13 wherein the portion less than all of the data comprises a first part of the data.

15. The device of claim 14 wherein the portion less than all of the data comprises a last part of the data.

16. The device of claim 5 further comprising the controller configured to combine fragments of data to produce coalesced data before transferring data from the first cache to the second cache.

17. The device of claim 8 further comprising a second caching methodology of the multiple available caching methodologies including:
   determining a size of data to be stored for the write request as the attribute and selectively storing data associated with the write request to the first cache when the size of the data is less than a threshold size; and
   selectively storing the data associated with the write request to the second non-volatile memory when the data has a size greater than the threshold size.

18. The device of claim 17 further comprising the controller configured to:
   selectively transfer data from the first cache to the second non-volatile memory; and
   selectively transfer data from the second cache to the second non-volatile memory.

19. The device of claim 8 further comprising the controller configured to store the data associated with the write request in sequential physical addresses of the second non-volatile memory when a type of the data is a specific type regardless of a size of the data.

20. The device of claim 19 wherein the specific type comprises video data or audio data.

* * * * *